United States Patent
Dybsetter et al.

(10) Patent No.: US 8,086,892 B2
(45) Date of Patent: *Dec. 27, 2011

(54) MICROCODE CONFIGURABLE FREQUENCY CLOCK

(75) Inventors: Gerald L. Dybsetter, Scotts Valley, CA (US); Jayne C. Hahain, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,457

(22) Filed: Sep. 20, 2010

(65) Prior Publication Data

US 2011/0010576 A1  Jan. 13, 2011

Related U.S. Application Data

(63) Continuation of application No. 11/256,290, filed on Oct. 21, 2005, now Pat. No. 7,802,124.

(60) Provisional application No. 60/623,257, filed on Oct. 29, 2004.

(51) Int. Cl.
- *G06F 1/00* (2006.01)
- *G06F 1/04* (2006.01)
- *G06F 1/12* (2006.01)
- *H04B 10/00* (2006.01)

(52) U.S. Cl. ........ 713/600; 713/500; 713/501; 713/502; 398/135

(58) Field of Classification Search .......... 713/500, 713/501, 502, 600; 398/135
See application file for complete search history.

(56) References Cited

U.S. PATENT DOCUMENTS

| | | | |
|---|---|---|---|
| 3,909,791 A * | 9/1975 | van den Berg | ............... 713/501 |
| 4,093,988 A | 6/1978 | Scott | |
| 4,330,870 A | 5/1982 | Arends | |
| 4,745,573 A | 5/1988 | Lebel | |
| 4,947,411 A * | 8/1990 | Shiraishi et al. | ............... 377/47 |
| 5,003,591 A | 3/1991 | Kauffman et al. | |
| 5,550,666 A | 8/1996 | Zirngibl | |
| 5,778,218 A | 7/1998 | Gulick | |
| 5,812,857 A | 9/1998 | Nelson et al. | |
| 5,845,077 A | 12/1998 | Fawcett | |
| 5,956,168 A | 9/1999 | Levinson et al. | |
| 5,994,940 A | 11/1999 | Kawasaki | |
| 6,081,888 A | 6/2000 | Bell et al. | |
| 6,449,075 B1 | 9/2002 | Watson et al. | |
| 6,735,731 B2 | 5/2004 | Ewen et al. | |

(Continued)

FOREIGN PATENT DOCUMENTS

JP  59110227 A * 6/1984

OTHER PUBLICATIONS

U.S. Appl. No. 11/119,447 Office Action mailed Jun. 23, 2006.

(Continued)

*Primary Examiner* — Mark Connolly

(74) *Attorney, Agent, or Firm* — Maschoff Gilmore & Israelsen

(57) ABSTRACT

A microcode configurable frequency clock that may be used to control the speed of high speed comparison in an operational optical transceiver. The frequency clock includes a memory and a logic circuit. The memory receives microcode generated data relating to the desired speed of comparison. The logic circuit is configured to receive an input clock signal and to produce an output clock signal by frequency dividing the input signal based on the microcode generated data. The output clock is used to control the speed of comparison in the optical transceiver.

20 Claims, 2 Drawing Sheets

U.S. PATENT DOCUMENTS

| | | | |
|---|---|---|---|
| 6,862,322 B1 | 3/2005 | Ewen et al. | |
| 7,080,245 B2 | 7/2006 | Ballard et al. | |
| 7,146,412 B2 | 12/2006 | Turnbull | |
| 7,215,891 B1 | 5/2007 | Chiang et al. | |
| 7,249,353 B2 | 7/2007 | Zarco | |
| 7,269,191 B2 | 9/2007 | Stewart et al. | |
| 7,313,681 B2 | 12/2007 | Chen et al. | |
| 7,606,486 B2 | 10/2009 | Dybsetter et al. | |
| 7,801,449 B2 | 9/2010 | Hahin et al. | |
| 7,802,124 B2 * | 9/2010 | Dybsetter et al. | 713/500 |
| 7,957,651 B2 | 6/2011 | Ekkizogloy et al. | |
| 7,974,538 B2 | 7/2011 | Hahin et al. | |
| 2002/0027688 A1 | 3/2002 | Stephenson | |
| 2002/0112070 A1 | 8/2002 | Ellerbrock et al. | |
| 2002/0176131 A1 | 11/2002 | Walters et al. | |
| 2002/0176138 A1 | 11/2002 | Schlanger | |
| 2003/0002108 A1 | 1/2003 | Ames et al. | |
| 2003/0152390 A1 | 8/2003 | Stewart et al. | |
| 2003/0154282 A1 | 8/2003 | Horvitz | |
| 2004/0017794 A1 | 1/2004 | Trachewsky | |
| 2004/0022537 A1 | 2/2004 | Mecherle et al. | |
| 2004/0052528 A1 | 3/2004 | Halgren et al. | |
| 2004/0103347 A1 | 5/2004 | Sneed et al. | |
| 2004/0136422 A1 | 7/2004 | Mahowald et al. | |
| 2004/0136720 A1 | 7/2004 | Mahowald et al. | |
| 2004/0151073 A1 | 8/2004 | Preisach | |
| 2004/0202476 A1 | 10/2004 | Woolf et al. | |
| 2004/0260798 A1 | 12/2004 | Addinton et al. | |
| 2005/0044335 A1 | 2/2005 | Bee et al. | |
| 2005/0132349 A1 | 6/2005 | Roberts et al. | |
| 2006/0051049 A1 | 3/2006 | Hahin | |
| 2006/0051097 A1 | 3/2006 | Dybsetter et al. | |
| 2006/0051098 A1 | 3/2006 | Hahin | |
| 2006/0092051 A1 | 5/2006 | Dybsetter et al. | |
| 2006/0093370 A1 | 5/2006 | Ekkizogloy | |
| 2006/0093371 A1 | 5/2006 | Hahin | |

OTHER PUBLICATIONS

U.S. Appl. No. 11/119,447 Office Action mailed Nov. 29, 2006.
U.S. Appl. No. 11/119,447 Office Action mailed Jul. 6, 2007.
U.S. Appl. No. 11/119,447 Office Action mailed Apr. 8, 2008.
U.S. Appl. No. 11/119,447 Office Action mailed Dec. 5, 2008.
U.S. Appl. No. 11/119,447 Notice of Allowance mailed Jun. 8, 2009.
U.S. Appl. No. 11/220,769 Office Action mailed Mar. 19, 2008.
U.S. Appl. No. 11/220,769 Office Action mailed Jul. 16, 2008.
U.S. Appl. No. 11/220,769 Office Action mailed Jan. 22, 2009.
U.S. Appl. No. 11/220,769 Office Action mailed Sep. 25, 2009.
U.S. Appl. No. 11/220,769 Office Action mailed Mar. 25, 2010.
U.S. Appl. No. 11/220,769 Notice of Allowance mailed Apr. 29, 2010.
U.S. Appl. No. 11/220,769 Notice of Allowance mailed May 21, 2010.
U.S. Appl. No. 11/220,765 Office Action mailed Mar. 19, 2008.
U.S. Appl. No. 11/220,765 Office Action mailed Jul. 16, 2008.
U.S. Appl. No. 11/220,765 Final Office Action mailed Jan. 28, 2009.
U.S. Appl. No. 11/220,765 Final Office Action mailed Oct. 26, 2009.
U.S. Appl. No. 11/220,765 Office Action mailed May 12, 2010.
U.S. Appl. No. 11/256,329 Office Action mailed Apr. 8, 2008.
U.S. Appl. No. 11/256,329 Office Action mailed Dec. 9, 2008.
U.S. Appl. No. 11/256,329 Office Action mailed Aug. 13, 2009.
U.S. Appl. No. 11/256,329 Final Office Action mailed Mar. 30, 2010.
U.S. Appl. No. 11/256,329 Office Action mailed Aug. 27, 2010.
U.S. Appl. No. 11/256,329 Notice of Allowance mailed Jan. 26, 2011.
U.S. Appl. No. 11/256,498 Office Action mailed Apr. 2, 2008.
U.S. Appl. No. 11/256,498 Office Action mailed Dec. 17, 2008.
U.S. Appl. No. 11/256,498 Office Action mailed Aug. 13, 2009.
U.S. Appl. No. 11/256,498 Office Action mailed Mar. 26, 2010.
U.S. Appl. No. 11/256,498 Notice of Allowance mailed Feb. 28, 2011.
U.S. Appl. No. 11/256,290 Office Action mailed Feb. 19, 2008.
U.S. Appl. No. 11/256,290 Office Action mailed Sep. 3, 2008.
U.S. Appl. No. 11/256,290 Office Action mailed Apr. 6, 2009.
U.S. Appl. No. 11/256,290 Office Action mailed Dec. 29, 2009.
U.S. Appl. No. 11/256,290 Notice of Allowance mailed Mar. 19, 2010.
U.S. Appl. No. 11/256,290 Notice of Allowance mailed May 14, 2010.

* cited by examiner

MICROCODE CONFIGURABLE FREQUENCY CLOCK

CROSS-REFERENCE TO RELATED APPLICATIONS

This application is a continuation of U.S. patent application Ser. No. 11/256,290 filed Oct. 21, 2005, which claims the benefit of U.S. Provisional Application No. 60/623,257, filed Oct. 29, 2004, each of which is incorporated herein by reference in its entirety.

BACKGROUND

1. The Field of the Invention

Embodiments of the present invention relate generally to programmable frequency clocks. More specifically, disclosed embodiments relate to programmable frequency clocks in optical transceivers that control the speed of high speed comparison in the optical transceiver.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

The operation of an optical transceiver is susceptible to its operating environment and to other operational parameters. Changes in operational parameters such as temperature or laser bias current can have an effect on the output performance of the optical transceiver. To help monitor any operational parameter changes, the optical transceiver may include a comparator circuit.

A comparator circuit is used to make comparisons between actual operational parameter values and desired operational parameter values. For example, a comparator may take a measured operational temperature value and compare that with a desired operational temperature value. The result of the comparison may then be reported to other circuitry in the optical transceiver. If the comparison is outside of an acceptable range, then the optical transceiver may take appropriate action. Thus it can be seen that the speed of the comparator circuit is very important. The faster the comparator can produce a comparison result, the faster the optical transmission device can make any needed adjustments.

In many cases, the speed of the comparator circuit is driven by the speed of the clock signal that controls the rate at which signals representing the desired operational parameter values are received by the actual analog comparators within the high speed comparator circuit. These signals are usually digital and must be converted to analog by a Digital to Analog Converter (hereinafter also referred to as "DAC") contained within the comparator circuit. However, the DAC can only efficiently operate at certain clock speeds. This is due to physical limitations in the silicon that the DAC has been implemented in. If the clock speed is too fast, the desired operational parameter values may arrive at the input to the DAC before the DAC is ready, causing potentially inaccurate comparisons. On the other hand, if the clock speed is too slow, time is wasted as the comparison process is slower than necessary.

One solution to this problem is to measure the actual silicon speed of each DAC and determine the clock speed accordingly. This is time consuming and problematic if multiple DACs are from different silicon wafers. Another approach is to find a range of speeds that the different DACs can efficiently operate at and set the clock speed accordingly. For example, if the DACs can efficiently operate at a clock cycle period ranging from 93 nanoseconds (ns) to 370 ns, then the clock period would need to be approximately 400 ns to ensure each DAC can efficiently operate at the clock speed under the worst case scenario. Accordingly, the clock period could be set at 400 ns even if the actual DAC is able to efficiently operate at clock periods as short as 93 ns. Again, valuable time is wasted as the clock speed is not as fast as it could be.

Therefore, what would be advantageous is for a mechanism that allows for more optimal high speed comparisons regardless of the particular silicon instantiation of the DAC.

SUMMARY

The forgoing problems with the prior state of the art are overcome by the principles of the present invention, which relate to a microcode configurable frequency clock that is used to control the speed of high speed comparison in an operational optical transceiver. The frequency clock includes a memory and a logic circuit. The memory receives microcode generated data relating to a desired clock speed. The logic circuit is configured to receive an input clock signal and to produce an output clock signal by frequency dividing the input signal based on the microcode generated data. The output clock is used to control the speed of comparison in the optical transceiver.

Accordingly, the disclosed embodiments have many advantages over the prior art. For example, at least one embodiment is capable of maintaining high speed comparisons regardless of the variations in silicon speed of different digital-to-analog converters (DACs). Use of microcode to drive the programmable frequency clock allows for the selection of the optimum clock speed without having to know any actual DAC silicon speeds values. It is possible embodiments to produce as many different clock speeds as required.

Additional features and advantages will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

The principles of the present invention relate to a microcode configurable frequency clock that may be used to control the speed of high speed comparison in an operational optical transceiver. The microcode configurable frequency clock includes a memory and a logic circuit. The memory receives microcode generated data relating to the desired speed of comparison. The logic circuit is configured to receive an input clock signal and to produce an output clock signal by frequency dividing the input signal based on the microcode generated data. The output clock is used to control the speed of comparison in the optical transceiver. An example operational optical transceiver environment will first be described. Then, the operation in accordance with the invention will be described with respect to the operational environment.

Figure 1:
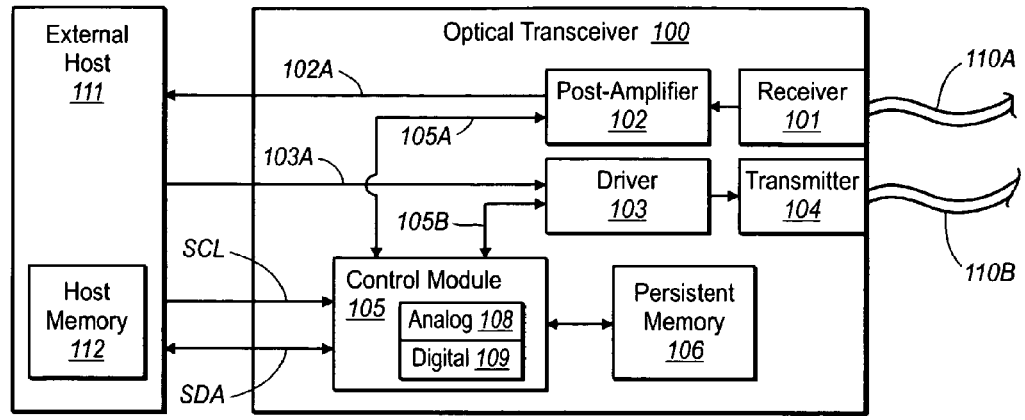
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
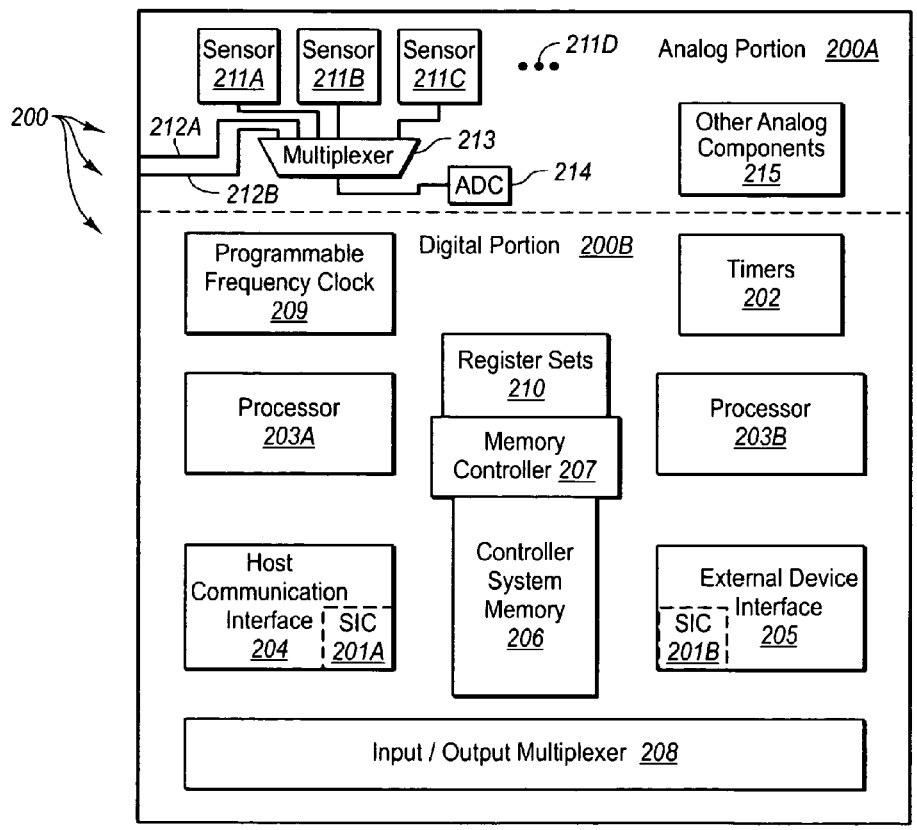
FIG. 2 schematically illustrates an example of the control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

A microcode configurable frequency clock 209 is used to control the clock speed in the optical transceiver high speed comparator. As will be described in further detail below with respect to FIG. 3, the microcode configurable frequency clock 209 may change in operational frequency depending on data within a memory location. The data may be generated by executing microcode that causes the processors 203 to populate the memory location. Accordingly, the frequency of the clock 209 may be varied as appropriate. More regarding this microcode configurable frequency clock 209 will be described further below.

Register sets 210 contain a number of individual registers. These registers may be used by the processors 203 to write microcode generated data that controls high speed comparison in optical transceiver 100. For example, the registers could contain ideal transceiver 100 operational parameter values for comparison with actual operational parameters. Alternatively, the registers may hold data selecting operational parameters for comparison.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

Figure 3:
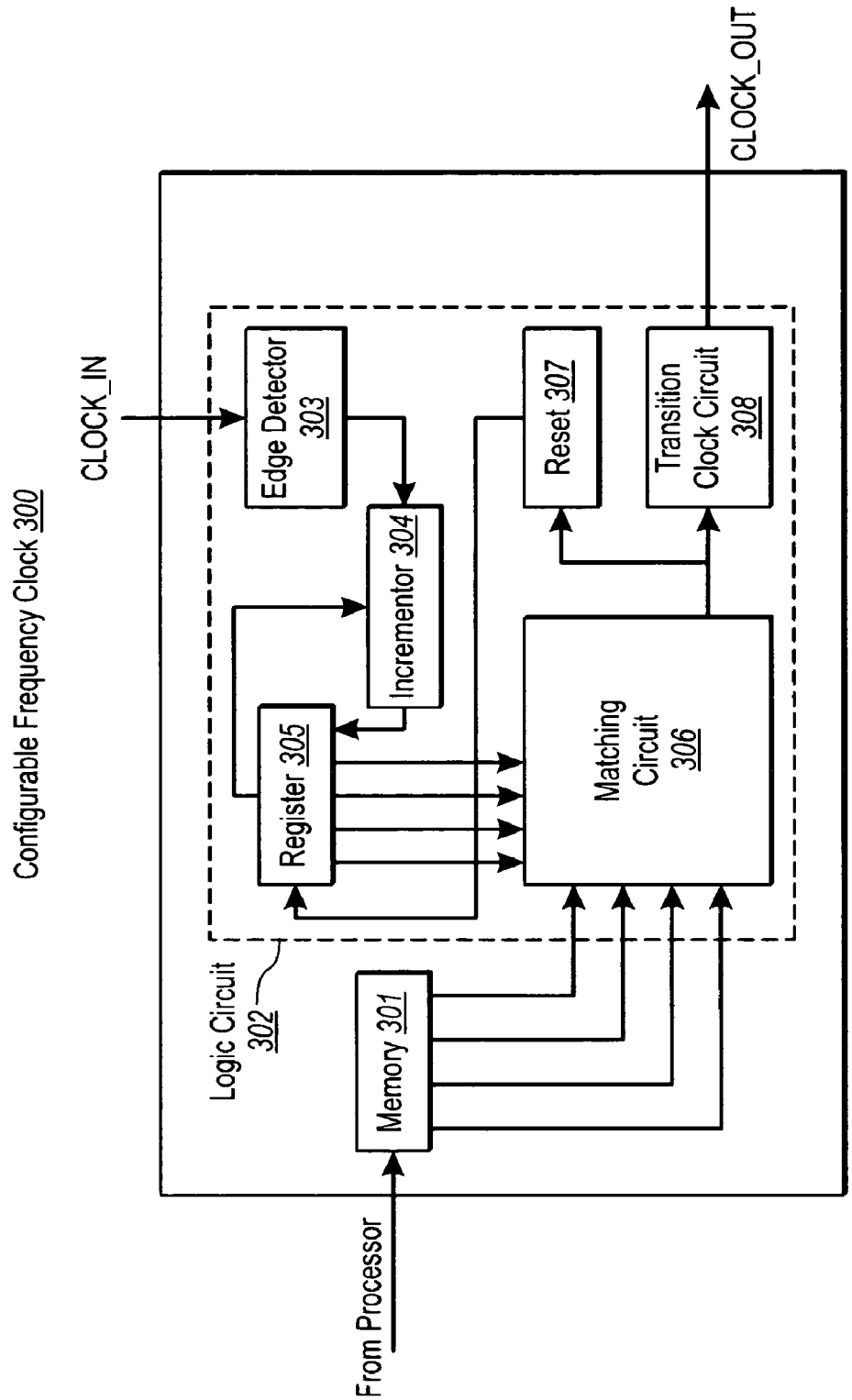
FIG. 3 schematically illustrates an embodiment of a programmable frequency clock in accordance with the principles of the present invention.

As mentioned previously, transceiver 100 may contain high speed comparators, which would correspond to other analog components 215. These high speed comparators are used to compare actual operational parameters such as temperature or voltage with a desired operational parameter value. Microcode configurable frequency clock 209 provides the clock signal that controls the speed of the high speed comparators. Programmable frequency clock 209 allows for more optimal high speed comparison regardless of Digital to Analog Converter (DAC) silicon speed by using microcode to adjust the speed as appropriate for the individual circumstances associated with the particular silicon instantiation of the DACs. FIG. 3 illustrates an example 300 of the microcode configurable frequency clock 209 in further detail. Microcode configurable frequency clock 300 receives a CLOCK_IN signal at a given frequency and outputs a CLOCK_OUT signal at different frequency that is determined by microcode.

Microcode configurable frequency clock 300 contains a memory 301. In the description and in the claims, memory 301 is defined as any memory device. Suitable memory devices may include, for example, a register, a flip-flop, RAM, non-volatile memory, or any other memory device. Memory 301 receives microcode-generated data from processors 203. The microcode-generated data (hereinafter referred to as "control data") controls the speed of comparison in the high speed comparators by appropriately setting and/or varying the speed of the CLOCK_OUT signal. The control data may be selected by a user based on the determined speed of the DACs.

For example, suppose the clock period of the output clock signal was 100 ns. However, if it was determined that the DAC silicon could only handle clock periods of 200 ns or greater, a user would indicate this to the processors 203. The processors 203 would then cause the input representing 200 ns to be used as the control data for controlling the microcode configurable frequency clock 300 to output a 200 ns CLOCK_OUT signal. Alternatively, the processors may automate the determination of an appropriate clock speed by varying the clock speed, providing known selection and comparison values into the register sets 210 and then evaluating the comparison results to determine what clock speeds result in successful comparison. The fastest of these clock speeds (with potentially some margin for error being factored in) may then be selected as the clock speed that is most suitable for this instantiation of the comparator.

Microcode configurable frequency clock 300 also contains a logic circuit 302. The logic circuit 302 is defined in the description and the claims as any circuit, analog or digital, that receives a clock input signal, executes frequency processing on that signal such as, but not limited to, division or multiplication, and outputs a clock output signal that is different from the clock input signal. This may include a simple counter circuit. The frequency division or multiplication that logic circuit 302 performs on the clock input signal is determined by the control data from memory 301. As mentioned above, the CLOCK_OUT signal then controls the speed of comparison in a high speed comparator.

Referring to FIG. 3, an example embodiment of microcode configurable frequency clock 300 will be described in further detail. It should be noted that this embodiment illustrates only one of many possible embodiments of logic circuit 302 and memory 301. One of ordinary skill in the art will appreciate the numerous logic circuits and memories that may be implemented in accordance with embodiments of the present invention. In the example embodiment, suppose the microcode configurable frequency clock 300 receives a 40 MHz CLOCK_IN signal. This corresponds to a clock period of 25 ns. Memory 301 in this example is a four bit register, although this is not required. If it were desirable to set the CLOCK_OUT clock period to 100 ns to thereby slow the clock speed, then memory 301 may receive microcode generated control data in the form of a binary [0100] from processors 203.

Logic circuit 302 may comprise in this example, an edge detector 303, an incrementor 304, a register 305, a matching circuit 306, a reset 307, and a transition clock circuit 308. Edge detector 303 receives the 40 MHz CLOCK_IN signal. During each clock cycle of 25 ns, edge detector 303 detects the clock edge of the pulse signal. This causes a logic high to be sent to incrementor 304 each time an edge is detected. Thus, each time an edge is detected, the incrementor 304 increments the value in register 305.

Register 305 may be a four bit register that is initially set at binary [0000]. The register 305 provides its value to the matching circuit 306. Matching circuit 306 compares the values in memory 301 and register 305. If the values are the same, then the matching circuit 306 may output a logical high signal, and otherwise outputs a logical low signal. This matching circuit 306 may be any matching circuit currently known in the art capable of matching different digital signals. At the first detection of an edge, the value in register 305 is incremented to a binary [0001]. This value is sent to matching circuit 306 where it is compared with the binary [0100] from memory 301. Since there is no match, a logic low signal is sent to reset circuit 307 and transition clock circuit 308. The transition clock circuit 308 only transitions the CLOCK_OUT signal when it receives a logical high signal from the matching circuit 306. Accordingly, the CLOCK_OUT signal does not transition at this stage. Furthermore, the reset circuit 307 only resets the value in register 305 to a binary [0000] if the reset circuit 307 receives a logical high signal from the matching circuit 306. Accordingly, the register value in register 305 remains unchanged at the binary [0001].

In the second and third edge transitions in clock signal CLOCK_IN, incrementor 304 writes a binary [0010] and a binary [0011] respectively to register 305. These are each sent to matching circuit 306 for comparison with the [0100] from memory 301. Again, as there is no match, a logic low is sent to the input of transition clock 308. Accordingly, the CLOCK_OUT signal stays the same.

At the fourth edge transition in clock signal CLOCK_IN, the register is incremented to a binary [0100]. This value is sent to matching circuit 306. This time, however, the matching circuit 306 matches this value with the [0100] from memory 301. Since there is a match now, the matching circuit 306 outputs a logical high to transition clock circuit 308. This causes transition clock 308 to transition the CLOCK_OUT signal either from a high to a low, or from a low to a high as appropriate.

The logic high signal from matching circuit 306 also causes reset circuit 307 to reset register 304 to a binary [0000]. In this way, the process just described may start over again on the next clock cycle. Thus, in this case, the control data of a binary [0100] causes the CLOCK_OUT signal to transition at one fourth of the frequency of the CLOCK_IN signal.

In some embodiments, microcode configurable frequency clock 300 may be configured to independently control the speed of both the high and low pulse widths of the output clock signal. This enables the varying of the lengths of the high and low pulse widths should this be desirable. For example, in some implementations of the present invention, the high pulse width may be used to reset the DACs during operation. The speed that the DAC silicon can handle would be used to determine the length of the high pulse. There may also be reasons for varying the length of the low pulse.

In this case, memory 301 may receive from the processors microcode that determines the length of the high pulse width and the low pulse width. Memory 301 may be an eight bit register that stores four bits of control data defining the length of the high pulse width and four bits of control data defining the length of the low pulse width. The four bits of control data for either the high or the low pulse may define width lengths between 100 ns and 1600 ns. Logic circuit 302 may be configured to output a clock out signal that has a high pulse width and a low pulse width determined by the memory 301. Logic circuit 302 may be any logic circuit known to one skilled in the art capable of receiving a clock in signal, reading the microcode from memory 301, and producing a clock out signal with a high pulse width and a low pulse width the desired length.

For example, it may be desirable to have a high pulse width of 500 ns and a low pulse width of 100 ns in one implementation. Later, it may be desirable to have a high pulse width of 100 ns and a low pulse width of 500 ns in another implementation. Changing the microcode written to memory 301 allows for the change in the lengths of the pulse widths.

Accordingly, the principles of the present invention provide for a microcode configurable frequency clock. For example, the present invention is capable of maintaining high speed comparisons regardless of the variations in silicon speed of the different DACs. Use of microcode to initiate the microcode configurable frequency clock allows for the selection of the optimum clock speed without having to know any actual DAC silicon speeds values. It is possible for the present invention to produce as many different clock speeds as required. Accordingly, the principles of the present invention represent a significant advancement in the art of high speed comparators.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A microcode configurable frequency clock for controlling a comparator comprising:
   a memory configured to receive microcode generated data that controls a speed of comparison for the comparator; and a logic circuit that is configured to receive an input clock signal and frequency process the input clock signal as directed by the microcode generated data to generate an output clock signal that is adapted to control the speed of comparison for the comparator.

2. The microcode configurable frequency clock for controlling a comparator in accordance with claim 1, wherein the memory is one of a register, a flip-flop, Random Access Memory (RAM), or a non-volatile memory.

3. The microcode configurable frequency clock for controlling a comparator in accordance with claim 1, wherein the memory receives the microcode generated data from a microprocessor.

4. The microcode configurable frequency clock for controlling a comparator in accordance with claim 1, wherein the logic circuit is a counter.

5. The microcode configurable frequency clock for controlling a comparator in accordance with claim 1, wherein the logic circuit includes a matching circuit.

6. The microcode configurable frequency clock for controlling a comparator in accordance with claim 1, wherein the logic circuit includes an edge detector.

7. The microcode configurable frequency clock for controlling a comparator in accordance with claim 1, wherein the logic circuit includes a transition clock circuit.

8. The microcode configurable frequency clock for controlling a comparator in accordance with claim 1, wherein the logic circuit includes an incrementor.

9. The microcode configurable frequency clock for controlling a comparator in accordance with claim 1, wherein the microcode configurable frequency clock is implemented in an optical transceiver.

10. A system comprising:
   a comparator comprising a digital to analog converter (DAC); and
   a microcode configurable frequency clock for controlling a speed of comparison for the comparator, the microcode configurable frequency clock comprising:
      a memory configured to receive microcode generated data that controls the speed of comparison for the comparator; and
      a logic circuit that is configured to receive an input clock signal and frequency process the input clock signal as directed by the microcode generated data to generate an output clock signal that is adapted to control the speed of comparison for the comparator.

11. The system of claim 10, wherein the memory is one of a register, a flip-flop, Random Access Memory (RAM), or a non-volatile memory.

12. The system of claim 10, wherein the memory is configured to receive the microcode generated data from a microprocessor.

13. The system of claim 10, wherein the logic circuit is a counter.

14. The system of claim 10, wherein the logic circuit comprises:
   a register;
   a matching circuit coupled to the memory and to the register;
   a transition clock circuit coupled to an output of the matching circuit;
   a reset circuit coupled between the output of the matching circuit and an input of the register;
   an incrementor coupled to the register; and
   an edge detector coupled to the incrementor.

15. The system of claim 10, wherein the microcode configurable frequency clock is implemented in an optical transceiver.

16. A microcode configurable frequency clock for controlling a comparator, the microcode configurable frequency clock comprising:
   a memory configured to receive microcode generated data that controls a speed of comparison for the comparator, wherein the microcode generated data includes a first set of bits that define high pulse widths and a second set of bits independent from the first set of bits that define low pulse widths of an output clock signal; and
   a logic circuit that is configured to:
      receive an input clock signal comprising a high pulse and a low pulse;
      frequency process the input clock signal high pulse as directed by the microcode generated data to generate a high pulse of the output clock signal; and
      frequency process the input clock signal low pulse as directed by the microcode generated data to generate a low pulse of the output clock signal, wherein the high pulse and the low pulse of the output clock signal control the speed of comparison for the comparator.

17. The microcode configurable frequency clock of claim 16, wherein a speed of the high pulse of the output clock signal is greater than a speed of the low pulse of the output clock signal.

18. The microcode configurable frequency clock of claim 16, wherein a speed of the low pulse of the output clock signal is greater than a speed of the high pulse of the output clock signal.

19. The microcode configurable frequency clock of claim 16, wherein the memory comprises at least one of a register, a flip-flop, Random Access Memory (RAM), or a non-volatile memory.

20. The microcode configurable frequency clock of claim 16, wherein the microcode configurable frequency clock is implemented in an optical transceiver.

* * * * *